United States Patent Office
3,021,318
Patented Feb. 13, 1962

3,021,318
PARTIAL SAPONIFICATION AND PARTIAL DEHYDROHALOGENATION OF VINYL HALIDE-VINYL ESTER COPOLYMERS
Xavier V. Laporta, Ewingville, N.J., assignor to American-Marietta Company, Stoner-Mudge Co. Division, Chicago, Ill., a corporation of Illinois
No Drawing. Filed Oct. 24, 1957, Ser. No. 692,033
7 Claims. (Cl. 260—87.1)

The present invention relates to the partial saponification of copolymers including a vinyl ester of a fatty acid as a constituent in the copolymer molecule. The invention includes an improved method for effecting the partial saponification of such copolymers. The invention more particularly relates to the alkaline treatment of copolymers of vinyl halide, e.g., chloride, with vinyl fatty esters, e.g., the acetate, to simultaneously partially saponify and partially dehydrohalogenate such copolymers. The invention includes the partially saponified and partially unsaturated copolymers which are produced, said partial unsaturation being produced as a result of the dehydrohalogenation of the vinyl halide component of the copolymer.

In accordance with the invention, partial saponification may be applied to any vinyl-type copolymer which contains a saponifiable vinyl ester of a fatty acid. The vinyl copolymers of this type which are in commercial use are largely copolymers of vinyl acetate, and it is to the modification of the compatibility and the thermosetting properties of these types of copolymers that the present invention is mainly directed. However, the modification of other copolymers including a vinyl ester of a fatty acid as a constituent in the copolymer molecule such as vinyl butyrate and vinyl 2-ethylhexoate is also within the scope of the invention. Copolymers of vinyl chloride and vinyl acetate, or of vinyl chloride, vinyl acetate, and maleic acid, are especially adapted to the new process. Among such copolymers there may be used, for example, copolymers of vinyl chloride and vinyl acetate in proportions by weight of between 60 and about 96% of vinyl chloride and preferably copolymers of vinyl chloride and vinyl acetate containing from 80% to 92% by weight of vinyl chloride, a copolymer of 87% by weight of vinyl chloride and 13% by weight of vinyl acetate being particularly preferred. These latter copolymers are exemplified by the commercially available products "Vinylite VYLF," and the similar but higher molecular weight "Vinylite VYHH," both manufactured by Bakelite Division, Union Carbide and Carbon Corportation, New York, New York. The starting material may also be a three-component vinyl copolymer, e.g., Bakelite's "Vinylite VMCH," i.e., a polymer of 86% vinyl chloride, 1% maleic acid and 13% vinyl acetate.

The hydrolysis or alcoholysis of vinyl chloride/vinyl acetate copolymers, to make them compatible with most of the resins, solvents, and additives commonly used in the production of film-forming compositions, has been described in U.S. Patent 2,512,726. This patent states that strong acid catalysts, such as mineral acids, are preferably employed as catalysts, and that although alkaline catalysts, such as sodium hydroxide, may be employed, the hydrolysis or alcoholysis is best carried out in an acid, rather than an alkaline medium. It is indicated in the prior patent that removal of chloride radicals is unsatisfactory because of the production of objectionable discoloration and degradation.

The process of the invention distinguishes from an acid solution hydrolysis reaction because of the achievement of controlled dehydrohalogenation to remove hydrogen chloride from the polyvinyl chloride part of the molecule without degradation thereby producing controlled unsaturation and consequent reactivity leading to thermosetting characteristics.

Prior efforts as in Patent 2,512,726, to employ alkaline hydrolysis in solution using large proportions of alkali in the presence of water and/or methanol produced darkly colored resins which darkened or scorched when baked. This color may be partly removed by washing which removes some yellow color associated with water and alcohol soluble chlorides from the product. These resins may be extensively bleached to further lighten the color but thermal instability remains. Despite vigorous efforts, the very best products obtained could not be blended to produce reproducible coatings from one batch to the next and the solution hydrolysis in alkaline medium was abandoned. Usually, films produced from the degraded resin are unsatisfactory due to poor film integrity and discoloration.

Alkaline solution hydrolysis has been carried out by the inventor under mild conditions in dioxane solution to hydrolyze the vinyl acetate component of vinyl chloride-vinyl acetate copolymers to vinyl alcohol but the resultant hydrolyzate recovered containing substantial vinyl alcohol content was found to be without significant unsaturation.

The unsaturation leading to useful thermosetting products of the invention must be substantial, and entails the removal of at least about 1.0 mol of hydrogen chloride per mol of copolymer. The predominant unsaturation produced is polyene unsaturation; generally three double bonds are necessary in those copolymer molecules which are affected by the dehydrohalogenating treatment to produce a thermosetting property per se. The minimum unsaturation set forth above can also be expressed as an average of at least about 1.0 double bonds per copolymer molecule. Average unsaturation of less than about 1.0 double bonds per copolymer molecule does not produce a sufficient enhancement in the insolubility and infusibility of the baked resinous film. The preferred unsaturated copolymers of the invention contain a substantial proportion of copolymer molecules which contain at least three double bonds.

The tendency to thermoset can be measured by improved resistance of films produced from the unsaturated saponified copolymers of the invention to acetone rubbing, and also by a higher minimum fusion temperature. Significant improvement in resistance to acetone rubbing and an increase in minimum fusion temperature is achieved when the average degree of unsaturation is about 1.0 double bonds per copolymer molecule. The double bonds which are present apparently lead to cross linking when the unsaturated copolymer is baked at temperatures of at least about 275° F. and preferably at a temperature of from 300-325° F., and more preferably in the presence of an oxygen supplying catalyst. This reactivity is indicative of the presence of conjugated double bonds but the invention is not limited to the presence or absence of conjugation.

The extent of unsaturation is readily defined by the corrected iodine number of about 2 to about 10 which is obtained for the saponified copolymers of the invention.

The iodine number which is determined is a corrected number since the initial copolymer prior to saponification shows a small iodine number indicative of inherent resin reducing character rather than unsaturation. This initial iodine number is subtracted from the final iodine number to provide a corrected iodine number indicative of the extent of unsaturation.

The iodine analysis used was the iodine monochloride method commonly used for determining unsaturation in fats and oils and is well known as the Wijs method and is reported in grams of iodine absorbed per 100 grams of resin.

For example, "VYLF" which is saponified in products of the invention has approximately one double bond which is produced per each 2000 units of molecular weight of about 6,000 to 9,000 so that each molecule which is dehydrohalogenated by the alkaline saponification contains from about 3 to about 5 double bonds.

The initial iodine values for the unsaponified starting copolymer is as follows: VYHH—iodine value 1.1; VYLF—iodine value 1.7. After saponification, the iodine number (after correction by subtraction of the initial iodine value) was, in all instances, at least about 2.0.

The specimens tested as above described were produced by subjecting a slurry or suspension of finely divided particles of "VYLF" and "VYHH" to potassium hydroxide hydrolysis for 4 hours at 65° C. in a liquid organic medium consisting of methanol and less than 2% by weight of water, the liquid medium containing 5% potassium hydroxide based on the weight of the copolymer. The slurry contained about 33% by weight of copolymer. All of the potassium hydroxide was consumed during the reaction. The amount of potassium hydroxide consumed during the reaction for dehydrohalogenation was about 30% of the initial amount charged.

Unsaturation measured by iodine number should be at least about 2.0 (corrected). Preferably, the corrected iodine number of the saponified product is between 3 and 10 and more preferably between about 4 and about 8. Excessive dehydrohalogenation, for example, to produce a corrected iodine number in excess of about 10 is characteristic of irretrievably degraded products.

Hydrolysis of a polymerized vinyl ester resin, particularly a vinyl chloride/vinyl acetate copolymer for the purpose of diminishing its solubility, is disclosed in the U.S. Patent 1,921,326. This is accomplished by precipitating the resin from solution with an ethyl alcohol solution of caustic soda. Contact with the resin is very brief under the conditions recited in the patent and no substantial modification of the resin is achieved. In contrast, substantial unsaturation without the production of thermally unstable products is achieved by the invention.

In United States Patent 2,458,639, the hydrolysis or alcoholysis of a copolymer of vinyl chloride, vinyl acetate, and maleic acid is described. Here again, it is indicated that alkaline hydrolysis is not preferred, because it was intended to selectively remove acetyl groups to yield a product which is not objectionably discolored. In contrast, these copolymers are rendered unsaturated by the invention and the unsaturated copolymers are thermally stable.

Thus, a method of saponification of vinyl copolymers in the present invention overcomes the shortcomings of previously known alkaline medium processes to produce products having improved thermosetting character and compatibility properties. The process of the invention avoids the corrosive conditions necessarily attendant upon performance of the reaction under strong acid condition. The resulting unsaturated resins also possess enhanced thermosetting properties when used in conjunction with other thermosetting resins, such as epoxy resins, alkyd resins, urea-formaldehyde resins, phenol-formaldehyde resins, co-reactive organic diisocyanates and alcohol blocked diisocyanates to form urethanes, and acrylic ester carboxylic acid resins such as copolymers of ethyl acrylate with acrylic acid and copolymers of ethly acrylate, acrylic acid and acrylonitrile. Further control of thermosetting co-reactivity in combination with the foregoing resins is afforded by controlling the extent to which the saponification and dehydrohalogenation are permitted to proceed.

In the invention, saponification is conducted to an intermediate extent so that not all of the vinyl acetate groups in the vinyl chloride/vinyl acetate copolymer are converted to vinyl alcohol. From about 15% to 85% and preferably from 30% to 78% of vinyl acetate groups in the copolymer molecule are converted to vinyl alcohol, the higher proportion of conversion to vinyl alcohol occurring at higher molecular weights of the polymer and with those copolymers of higher vinyl chloride content. Conversions of from 50% to 78% of vinyl acetate to vinyl alcohol by saponification of the copolymer are particularly preferred where the copolymer molecule contains from 80% to 95% by weight of vinyl chloride with the remainder of the copolymer molecule being substantially vinyl fatty acid ester, e.g., acetate. Irrespective of the initial content of vinyl acetate prior to saponification, the recovered product contains at least about 15% of the vinyl fatty acid ester groups initially present. Manifestly, the vinyl fatty acid ester groups which remain need not be acetate groups, but may be stearate, octoate or dodeconate, etc. The higher acid groups provide desirable internal flexibilization to the copolymer molecule produced.

The partially saponified and partially unsaturated vinyl chloride-vinyl fatty ester copolymers, exhibit significant thermosetting characteristics and baked films prepared from these modified copolymers possess substantially enhanced insolubility, as for example, resistance to acetone rubbing, as compared with the unmodified copolymer.

The present invention includes the suspension saponification of vinyl copolymers and the saponified unsaturated thermosetting copolymers which are produced. The invention also includes high solid solutions made with solvents containing a major proportion of aromatic hydrocarbon solvents, such as benzene, toluene and xylene and mixtures thereof, and aqueous and plasticizer dispersions which are produced from the particulate products of the invention. The full scope of the invention will be more fully set forth hereinafter.

In accordance with the invention, a slurry of the copolymer in particulate form in a substantially anhydrous liquid medium containing a lower aliphatic alcohol, for example, methanol, is subjected at slightly elevated temperature to the action of a strongly basic material until the basic material is consumed. The product is then recovered and washed. The basic material is selected from alkali metal hydroxides, alkali metal alcoholates and quaternary ammonium hydroxides. Of the strongly basic materials, potassium hydroxide is best, but sodium hydroxide is also very good. Certain alkali metal alcoholates such as sodium methylate, potassium methylate, sodium ethylate and potassium ethylate can be used with good results. Strongly basic quaternary ammonium bases such as N-benzyl-trimethyl ammonium hydroxide, tetramethyl ammonium hydroxide and tetraethyl ammonium hydroxide can also be employed.

The strongly basic material is normally employed in about stoichiometric quantities based on the conversion to a vinyl alcohol content of at least 2 and up to about 10% by weight, and an average removal of hydrogen chloride to provide at least about 1 double bond per copolymer molecule. Three or more double bonds of unsaturation are found in each copolymer molecule which is unsaturated by ultra-violet spectral analysis in preferred unsaturated products of the invention.

It has been found that about 30% of the total alkali employed is consumed in the dehydrohalogenation reaction with vinyl chloride while the remaining alkali is consumed in converting vinyl acetate to vinyl alcohol. It is further essential that at least 20% and preferably about at least 25% and not more than 35% of the total alkali consumed during both saponification and dehydrohalogenation be consumed exclusively for dehydrohalogenation.

Also the proportion of alkali consumed in dehydrohalogenation increases as the reaction conditions for saponification are made more vigorous. Less unsaturation is produced using the same total quantity of alkali when the alkali is supplied to the reaction medium incrementally. Briefly, dehydrohalogenation is favored at higher alkali concentration.

The proportion of alkali consumption attributable to dehydrohalogenation varies with the reaction conditions and also with the extent to which conversion of vinyl acetate to vinyl alcohol is permitted to occur.

Conversion of vinyl acetate to vinyl alcohol and the removal of hydrogen chloride proceed simultaneously and progressively from the start of the saponification reaction under the necessary conditions taught by the invention to produce a copolymer of moderate vinyl alcohol content which is substantially and controllably unsaturated and which is not thermally unstable, e.g., it will not become unacceptably scorched during baking at 300–350° F. for from 6–15 minutes.

The use of a large excess of alkali (above 35% excess beyond the amount required by stoichiometry) leads to thermally unstable products if this excess is consumed. It will be noted, as will be more evident in Table I and in the examples of the application, that the conversion of vinyl acetate to vinyl alcohol is not stoichiometric. Instead, a greater conversion is achieved than would be indicated on the basis of the amount of KOH consumed. For example, 5% of KOH when used to saponify VYHH copolymer slurried particles in accordance with the invention, would be expected to provide only 2.8% of vinyl alcohol. Unsaturation which is determined by recovery of potassium chloride liberated during reaction represents a consumption of KOH in this instance which serves to correct the total consumption value in determining that portion used for acetate saponification. On this basis, although 2.8% vinyl alcohol is is the amount which would be theoretically expected, as demonstrated in Example 1 of this application, 5.2% vinyl alcohol is determined by analysis. Amounts of alkali required therefore appear to be more than catalytic amounts and less than stoichiometric amounts in operating at high efficiencies.

An excess of total alkali can be used only in those cases where reaction is terminated before neutrality as by removal of copolymer particles from the reaction medium, or by the lowering of the reaction temperature before the material is unduly exposed to strong alkali without neutralization.

The alkali should not be used in unduly high concentration, for this will also result in degradation. The maximum concentration of strongly basic material is less than about 0.18 mol pounds of alkaline hydroxide per 100 pounds of slurried saponifiable resin. Preferably, the reaction in batch slurry processes is conducted with from about 0.05 to about 0.126 mol pounds of alkaline hydroxide per 100 pounds of slurried saponifiable resin present during the reaction, and in continuous manufacture, the value is raised to from about 0.09 mol pounds/100 pounds of slurried saponifiable resin, and upwards to the maximum limit, depending upon throughput. Shorter terms of reaction at increasing solids throughput call for stronger concentrations of alkali. Alkali may be added incrementally and this procedure is preferred in saponifying polymers of high vinyl chloride content.

By careful regulation of the proportion of strongly basic material used, the desired saponification and dehydrohalogenation can be accurately predetermined and the end point of the reaction noted by the approximately neutral pH of the solution, for example, as indicated by the removal of the red color of phenolphthalein.

The greater the proportion of alkali used, the greater is the extent of saponification achieved as measured by the vinyl alcohol content of the finished resin product. The results are not directly proportional to the amount of alkali employed, as will be appreciated from Table I, which follows, in which the percent of vinyl alcohol which is reported will be explained in the descriptive matter following the table.

TABLE I

"VYHH" resin, 20–25% slurry in anhydrous methanol, heated 4 hours at 65° C.

| Grams KOH per 100 grams "VYHH": | Percent vinyl alcohol |
|---|---|
| 1 | 3.2 |
| 2 | 5.0 |
| 3 | 5.2 |
| 5 | 5.2 |
| 7 | 5.3 |

As can be seen from the above Table I, in which the preferred reaction of 4 hours was used, the preferred unsaturated copolymers containing vinyl alcohol produced by the invention contain about 3% to 5% of vinyl alcohol by weight. For coating purposes, the copolymer should contain at least about 2% and preferably at least 3% of vinyl alcohol by weight.

In order to achieve a practical reaction time, the concentration of strongly basic material should be above about 0.018 mol pounds per 100 pounds of slurried saponifiable resin at the start of the saponification reaction.

In accordance with preferred operation of the method of the invention, the copolymer slurry which is produced contains approximately 15% to 60% by weight of solid material based on the total weight of resin and liquid organic medium. The best proportion of solid in the slurry will vary somewhat depending on various factors including the type of mixing equipment used.

The size of the copolymer particles does not specifically determine the operability of the invention. The copolymer is particulate in form and is preferably finely divided. Since the copolymer is not dissolved in the invention, it is directly recovered in particulate or bead form. This alone is of substantial value. It will be particularly noted at this point that the invention uniquely enables the saponification of copolymer resin particles of extremely small size without alteration of the size of the starting polymer particles.

The invention results in the production of vinyl alcohol containing copolymers which obviously cannot be produced by mere copolymerization of admixed monomers since these monomers do not embrace vinyl alcohol.

Accordingly, vinyl alcohol containing resin dispersions may be produced in accordance with the invention to result in a simultaneous control in the product of the parameters of vinyl alcohol content, particle size and unsaturation by a new and desirable method. The resin dispersions of the invention are further unique for the reason that the copolymer particles which are dispersed can be of a polyvinyl alcohol type that is not available in dispersion resin for plastisols. It is noted that a solution saponification not only destroys particle size but fails to provide the limited unsaturation in the recovery copolymer.

The copolymer particles in accordance with the invention have a diameter smaller than 1,000 microns and are preferably smaller than 250 microns in diameter. If larger particles are used, the saponification requires the use of longer reaction time.

The invention is of particular value when the starting copolymer particles have a diameter in the range of about 0.05 to 2 microns since the copolymer particles which are produced in accordance with the invention have substantially the same particle size as the starting copolymer particles from which they were produced. There is consequently produced in accordance with the invention new and useful dispersion resins suitable for the formulation of novel aqueous dispersions and plastisols.

In batch processing, best results are achieved using 33% by weight of solids in the slurry. For continuous treatment, about 40% to about 60% by weight of solids is preferred. Remarkably, the greater the proportion of solids, the more rapid is the reaction. At about 60% solids content, successful saponification and dehydrohalogenation have been produced with a reaction period of 15–20 minutes.

The slurry which is treated in accordance with the invention can be produced in various ways. Preferably, the copolymer particles are suspended in an aliphatic alcohol and the strongly basic material added to the preformed slurry. When this procedure is used the basic material may be added slowly and more of the alkali can be used without danger of copolymer degradation. On the other hand, the strongly basic material may be added to the liquid medium comprising an aliphatic alcohol and the copolymer particles added later. It has been found that incremental addition of basic material increases by about as much as 20% the degree of saponification which can be achieved.

It has been found that the anhydrous character of the liquid organic medium strongly influences the degree of saponification and the ultimate thermosetting properties of the finished resin product. As much as 5% by weight of water can be tolerated but it is preferred that the liquid organic medium contain less than 2% and preferably less than 1% by weight of water. It has been found that better control of the reaction is obtained when the alcohol used is substantially anhydrous and that this control is particularly well achieved when less than 1% by weight of water is present.

As a medium in which the saponification is conducted there is preferably used an organic liquid which has a swelling action on the saponified resin, such as a substantially anhydrous lower aliphatic alcohol of from one to four carbon atoms in the molecule or a mixture of a lower aliphatic alcohol with an active swelling solvent in an amount insufficient to alter the particulate entity of the slurried material during reaction. Strong vinyl resin solvents such as tetrahydrofuran, cyclohexanone, methyl ethyl ketone, may be employed in admixture to promote swelling. Methanol is the preferred liquid medium and in the preferred operation of the invention, at least a portion and preferably a major portion of the liquid organic medium comprises methanol.

This slurry is then reacted at a temperature ranging from about 60° C. to about 80° C. to convert the desired proportion of vinyl acetate to vinyl alcohol and to produce the desired unsaturation. The saponification and dehydrohalogenation reactions proceed with a reasonable rapidity. At temperatures above 80° C. the copolymer which is recovered exhibits inferior thermal stability. The upper limit of temperature may vary somewhat depending on the resin being treated, the extent of agitation and the proportion of strongly basic material which is present. The upper limit of about 80° C. represents a practical approximate upper limit for the reaction.

The completion of the reaction is normally indicated by the achievement of neutrality, e.g., a pH of about 7. This normally requires a reaction period of at least about ¼ hour and preferably between about ½ hour and 2 hours. The reaction is normally completed before about 10 hours and this latter time represents a practical maximum reaction time, although this maximum time is not a critical feature of the invention. In commercial batch production, a four hour reaction period is generally preferred. The reaction may be effected continuously as by extruding the slurry of the above-mentioned mixture through a tube past a heated zone (a portion of the tube is heated). This may be done in several ways, a particularly preferred procedure being the use of a flighted screw mounted for rotation within the heated tube. When operating continuously, it is preferred to employ the thicker slurries, e.g., slurries containing from 40% to 60% solids by weight per 100 parts of liquid medium.

After the reaction has been completed, the saponified copolymer is separated and purified by washing. Careful attention to the conditions under which the saponification is conducted permits control of the extent of the partial saponification of the ester group and control of the degree of dehydrohalogenation produced without encountering substantial degradation. Proper washing is important to control the presence of undesirable occluded salts in the saponified copolymer. All of the foregoing are factors which affect the ultimate thermosetting and compatibility characteristics of the finished resin product.

The minimum unsaturation to produce a significant thermosetting tendency which is desired, is the presence of a substantial number of double bonds in the saponified copolymer as defined by iodine number above.

In comparison with hydrolysis or alcoholysis under acid conditions, the present process has the advantage of economy in reagent consumption in that neutralization can be dispensed with. In the case of maleic acid resins (VMCH) the neutralized maleic acid may be regenerated by a weak acid wash.

The washing operation is important in securing good thermosetting properties in the final resin. The purpose of this step is the removal of occluded salts from the slurried resin. To produce a commercially satisfactory resin product, the salt content should be less than 2% and preferably less than 1% as measured by the ash content based on the air dry weight of the copolymer. Another reason for the washing step is the removal of contaminating free alkali from the saponified copolymer, since this impurity also has an adverse effect on ultimate thermosetting properties. This adverse effect appears to be eliminated if the salt content determined as ash is about a few tenths of one percent.

The washing operation is generally best carried out with a minimum of three successive washes with an alcohol, or a minimum of two water washes followed by an alcohol wash. The alcohol which is used during washing is preferably the same type of alcohol as that employed in the saponification but a final wash with methanol or ethanol improves the washing operation. In carrying out the washing step, the material is agitated with the wash liquor followed by removal of the wash liquor by centrifuging, decantation or filtration.

When indicated, as in the saponification of an acid copolymer of vinyl acetate and vinyl chloride, e.g., VMCH, the washing liquor may have added a small quantity of acid, e.g., 5% of acetic acid or hydrochloric acid based on the weight of the VMCH resin present. In other instances it may be advantageous to add to the wash water about 1% of a wetting or penetrating agent, such as, for example, a sodium salt of an alkyl aryl sulfonate.

The effect of various types and combinations of wash liquors, and an indication of suitable washing sequence is illustrated by the experimental data set forth in Table II.

TABLE II

*Effect of washing liquors and sequence of washing steps on saponified copolymer*

| | |
|---|---|
| No wash | Unsatisfactory |
| 1 to 10 cold water washes | Unsatisfactory |
| 1 or 2 hot water washes | Unsatisfactory |
| 1 cold methanol | Unsatisfactory |
| 1 or 2 hot methanol washes | Unsatisfactory |
| 4 washes of 50:50 water-methanol | Unsatisfactory |
| 3 or more cold methanol washes | Satisfactory |
| 3 water, 1 methanol | Satisfactory |
| 3 water, 2 methanol | Satisfactory |
| 2 water, 2 methanol | Satisfactory |
| 3 washes of 90% methanol in water | Satisfactory |
| 2 water, 1 methanol | Satisfactory |
| 1 water, 2 methanol | Satisfactory |
| 3 water (containing acetic acid equal to 5% of the resin), 2 methanol | Satisfactory |
| 2 methanol, 3 water | Satisfactory |
| 4 water containing 1% of a wetting agent | Satisfactory |

Preferred washed copolymer products in accordance with the invention contain less than 1% by weight of occluded salt to produce the best film properties. Specifically, blush resistance or the resistance of the film to steam is reduced when more than 1% of occluded salt remains in the copolymer.

*Determination of the vinyl alcohol content of saponified vinyl copolymer resins*

The vinyl alcohol content of the partially saponified resin can be determined by acetylation with an acetic anhydride/pyridine reagent if the sample to be analyzed contains no other alcohol and is water-free. The acetic anhydride/pyridine reagent is made by adding 12 grams of acetic anhydride to 88 grams of freshly distilled pyridine. It must be stored in a dark-colored, glass-stoppered bottle to prevent discoloration. The solution must not be used if it is discolored. Discoloration occurs in about 2 days even under prescribed storage conditions.

Other reagents required for the analysis are a pyridine/water solution and a 0.75 N potassium hydroxide solution. These are prepared as follows:

*Pyridine/water solution.*—Add 12 milliliters of water to 138 milliliters of freshly distilled pyridine.

*0.75 N potassium hydroxide.*—Dissolve 45 grams of potassium hydroxide in 100 milliliters of anhydrous methanol and dilute to 1000 milliliters with freshly distilled pyridine. Add slowly, with agitation, 18 milliliters of a wetting agent (such as "Tergitol" Penetrant No. 4, manufactured by Carbide and Carbon Chemicals Company, a division of Union Carbide and Carbon Corporation). Standardize the resulting solution, using pure benzoic acid as the standard. This reagent will remain clear for about 2 days and must be discarded when discoloration occurs. The reagent should be stored in a brown glass container equipped with an all-glass delivery tube.

*Method.*—Weight 1.2–1.5 grams of the resin on a tared 75 mm. watch glass. Transfer the sample to a citrate bottle, by means of a dry, wide-stem funnel. Wash any resin remaining on the watch glass and funnel into the bottle, with 15 milliliters of pyridine (freshly distilled). Add exactly 10.0 milliliters of acetic anhydride/pyridine reagent. Stopper the bottle and wrap it, so that only the bottom is exposed. Place on the steam bath, and swirl it gently, from time to time, until the sample is dissolved. Leave the bottle on the steam bath for an additional one hour. Use ample quantities of steam, to insure 98° C. temperature. Remove the bottle, and allow it to cool to room temperature. Unwrap the bottle, remove the stopper, and add 15 milliliters of the pyridine/water solution. Close the bottle; swirl gently; and rewrap. Place on the steam bath for 30 minutes.

Remove the bottle and allow to cool to room temperature. Remove the stopper and wash down the rubber gasket and the inside of the bottle with 15 milliliters of pyridine. Restopper and cool in an ice bath for 15 minutes. Add 10 drops of phenolphthalein indicator and titrate with standard KOH reagent. When near the end-point, close the bottle and shake vigorously. Continue the titration to the first pink end-point which is permanent for at least 15 seconds.

Determinations are made in duplicate and duplicate blanks are also tested, by the same procedure, but omitting the sample. (The quantities of reagents outlined above will be sufficient to run 6 analyses, with blanks.)

Calculate the result as vinyl alcohol, using the following calculations:

$$\frac{(B-A) \times N \times 4.41}{\text{Weight of sample}} = \text{vinyl alcohol (percent by weight)}$$

Where $A$=KOH reagent (ml.) used for the sample;
$B$=KOH reagent (ml.) used for the blank;
$N$=normality of the KOH reagent.

As previously indicated, the saponified unsaturated copolymer products of the invention may be used in baking finishes with other thermosetting resinous materials to provide enhanced thermosetting of the combined products. Aldehyde condensates such as phenol-formaldehyde resins or aminoplast resins such as urea-formaldehyde and melamine-formaldehyde are suitable.

The thermosetting phenol-aldehyde resins which are preferred are solvent-soluble, non-oil-modified, alkaline condensed resinoids in which the ratio of aldehyde to phenol is 0.8:1 to 1.5:1. The phenol component includes alkyl substituted phenols preferably containing less than 6 atoms in the alkyl group, and mono-aryl substituted phenol-formaldehyde resins in which the aryl substituent may be substituted with an alkyl group containing up to 6 carbon atoms in the group, the latter being taste-free in sanitary coatings.

The catalyst employed to effect the condensation is an alkaline catalyst such as ammonia, caustic soda, sodium carbonate, triethanol amine, morpholine or similar base.

The resinoid possesses free methylol groups which are reactive with the hydroxy groups in the saponified vinyl chloride/vinyl acetate copolymers.

Suitable phenolic bodies which may be employed in the condensation with aldehyde to produce reactive phenol-aldehyde resinoids and which may be desirably employed in the present invention are as follows:

Phenol
3,5-dimethyl phenol (sym. xylenol)
3-methyl phenol (m-cresol)
*2-methyl phenol (o-cresol)
*2,3-dimethyl phenol (2,3-xylenol)
*2,3,5-trimethyl phenol (2,3,5-cumenol)
*2-phenyl phenol (o-phenyl phenol)
2-methyl, 5-ethyl phenol
2,5-dimethyl phenol
*2-tolyl phenol (o-tolyl phenol)
*2-isopropyl phenol
2-tert. butyl phenol
2-sec. amyl phenol
*p-Cresol
p-Tert. butyl phenol
p-Sec. amyl phenol
*3,4-dimethyl phenol (3,4-xylenol)
3-methyl, 4-isopropyl phenol
*Paraphenyl phenol Starred phenols are preferred. Also preferred for freedom of taste are mixtures of phenols which are di- and trifunctional, these including the starred phenols.

The preferred aldehyde is formaldehyde although other aldehydes such as acetaldehyde, benzaldehyde, furfuraldehyde, and the like may be used.

The urea-formaldehyde resins which are employed are produced by the alkaline condensation of an aldehyde particularly formaldehyde with urea. The aldehyde component is employed in a ratio of at least 1:1. The preferred urea-formaldehyde resins are produced by alkaline condensation using a mol ratio of formaldehyde to urea of 2:1.

Thus, in accordance with the invention, the urea-formaldehyde resins should be solvent-soluble and this is achieved by alkylating the urea resin. Alkylation is preferably effected with an alcohol containing at least about 4 carbon atoms in a molecule. The alkylation may be effected by either etherifying the urea-aldehyde resin after it has been produced or simultaneously with the condensation reaction. The alkylation is an etherification reaction which is carried out in slightly acid medium and when the alkylated product is to be prepared without first isolating the urea resin intermediate, the condensation reaction is first carried out in alkaline medium to permit the desired condensation and the reaction is then completed in slightly acid medium.

The melamine-formaldehydes which may be employed in accordance with the invention are produced by the condensation of an aldehyde particularly formaldehyde with melamine. Preferred melamine-formaldehyde resins in accordance with the invention are produced by reacting from 3 to 6 mols of formaldehyde with melamine and butylating the resin which is produced. The condensation and butylation reaction may be conducted simultaneously and usually in slightly acid medium, the reaction mixture being refluxed and water removed. From 1 to 6 mols of the alcohol, for example, butanol, are employed per mol of melamine. Any of the alcohols may be employed although butanol is preferred and the higher alcohols are preferred to the lower alcohols.

In preferred thermosetting compositions in accordance with the invention there may be included a resin component having free carboxyl groups, whereby improvement in adhesion and acceleration of thermosetting is observed.

This acidic resin component may conveniently be formed of one or a mixture of copolymers of (a) a vinyl halide, preferably vinyl chloride; (b) a vinyl ester of a lower saturated fatty acid, preferably vinyl acetate; and (c) an aliphatic alpha- beta- mono-olefinic carboxylic acid (preferably maleic acid) or anhydride, the amount of carboxylic acid combined in the copolymer being between about 0.1% and about 4% by weight of the whole copolymer, and the carboxyl groups in the copolymer being substantially unreacted. The optimum amount of maleic acid, when it is used as the third component of the copolymer, is about 0.3% to 3% by weight of the total acidic copolymer. The proportion of the vinyl halide component (a) in the copolymer is in the range of about 60% to about 98% by weight of the total copolymer, the balance being the said components (b) and (c) of the copolymer. The present preferred example of the acidic resin component is a copolymer of vinyl chloride and vinyl acetate and maleic acid in proportions by weight of about 86/13/1, as exemplified by "VMCH" of Bakelite Company, Union Carbide and Carbon Corporation of New York, New York. Other carboxylic acid copolymers such as well known copolymers of acrylic esters and/or styrene with acrylic acid may also be used. The copolymer backbone is preferably linear and bears free carboxyl groups to provide a carboxyl acidity similar to that in VMCH, namely about 1 to 5% of acid by weight.

The invention therefore produces from a vinyl halide vinyl ester copolymer a substantially undegraded resinous product containing free hydroxyl groups and substantial unsaturation providing a reactive resin which reacts and apparently cross-links when baked to produce a film which is substantially more infusible and insoluble than the unmodified copolymers from which it was produced. The copolymer product is soluble in organic media until after it has been reacted as by baking. For example, the copolymer may be dissolved in methyl ethyl ketone, either alone or together with other components such as the thermosetting resins referred to hereinbefore to contain 20% resin solids by weight and this solution may be used for coating, e.g., the coating of metals such as iron, aluminum and tin, and particularly commercial products such as blackplate and tinplate. The unsaturated copolymers of the invention appear to crosslink when baked at temperatures of about 275–325° F. Thermosetting is obtained with the copolymer per se but is preferably obtained in the presence of an oxygen supplying catalyst such as benzoyl peroxide or cobalt naphthenate.

The invention may be illustrated by the following examples, which are not to be considered as limiting:

EXAMPLE 1

33 grams of a vinyl chloride/vinyl acetate 87/13 copolymer ("Vinylite VYHH") are made into a slurry with 100 parts of anhydrous methanol, and to this slurry there is added, with stirring, 1.65 grams of potassium hydroxide in the form of a 20% solution in methanol. The resulting mixture is heated at a temperature of about 65° C. for four hours. When the reaction is complete, as evidenced by the achievement of a pH of less than pH 8, the supernatant liquor iis removed and the slurried resin is washed, successively, with 3 washes of 100 grams each of cold water, and 2 washes of 100 grams of cold methanol, the wash liquor being removed by centrifuging at the end of each wash, and the resin is dried. The product is a tri-component copolymer of vinyl chloride, vinyl acetate, and 5.2% vinyl alcohol. The product possessed substantial unsaturation (corrected iodine number about 4.5) and was reactive to produce a baked film possessing thermoset character as evidenced particularly by resistance to acetone rubbing. The product resisted darkening and scorching after baking at 350° F. for 10 minutes.

EXAMPLE 2

40 grams of a copolymer of vinyl chloride 84.1%, vinyl acetate 15% and maleic acid 0.9% is made into a slurry in 100 grams of anhydrous methanol, and to this slurry there is added gradually with stirring, 2.0 grams of potassium hydroxide in the form of a 20% solution in methanol. The mixture is heated to about 65° C. for 2 hours. When the reaction is complete, the supernatant liquor is removed, and the slurried resin is washed successively with 3–100 gram washes of cold water, followed by 2–100 gram washes of cold methanol, and then dried. When it is desired to regenerate the free maleic acid of the copolymer, a dilute mineral acid wash, such as dilute hydrochloric acid, may be substituted for the first water wash. The resulting copolymer contained about 4.8% vinyl alcohol. This product possessed substantial unsaturation (corrected iodine number about 4.4).

EXAMPLE 3

400 pounds of "Vinylite VYHH" resin were made into a slurry in 800 pounds of anhydrous methanol containing 20 pounds potassium hydroxide dissolved therein. The mixture was heated to 65° C. for 4 hours. The slurried resin was then washed with 200 pounds of cold methanol, then with 200 pounds of cold water, and then with 200 pounds methanol, and then a 70/30 mixture of xylene-isophorone was added to give a solution of the saponified resin containing 30% solids. The mixture was then heated under vacuum until all the residual methanol and water were distilled off. A clear solution of the saponified resin in the xylene-isophorone solvent was obtained. This solution was coated on tinplate and baked at 350° F. The film produced was resistant to acetone rubbing whereas the "VYHH" resin baked in a similar manner was not. The saponified resin contained about 5.8% by weight of vinyl alcohol and had a corrected iodine number of about 3.6.

EXAMPLE 4

12 pounds of "Vinylite VYLF" resin having a particle size range of 150–250 microns (a lower molecular weight grade of "VYHH" but of the same composition) were slurried in 24 pounds of anhydrous methanol in the presence of 0.48 pound of C.P. potassium hydroxide and heated with stirring at 63° C. for 3 hours. Washing was carried out in the same manner as in Example 3. The final resin had a vinyl alcohol content of 5.0% and contained substantial unsaturation (corrected iodine number of about 3).

EXAMPLE 5

In order to illustrate the effect of reaction time upon the vinyl alcohol content of the final resin, a 20% slurry of "VYHH" resin in anhydrous methanol was treated at 65° C. for 6 hours with potassium hydroxide, a total of about 3% by weight based upon the resin being added. Specimens were removed at the end of 1, 2, 4 and 6 hours. At the end of 1 hour the vinyl alcohol content was 4.7%. At the end of 2 hours heating, the vinyl alcohol content was 5.4%; at the end of 4 hours, it was 5.5%; and at the end of 6 hours, the vinyl alcohol content was 5.8% and the product contained substantial unsaturation. The corrected iodine number of the final product was about 5.6.

EXAMPLE 6

In order to illustrate the effect of other types of alkalis, 100 grams of "VYHH" resin were made into a 25% slurry in methanol, with 10 grams of sodium methylate and heated for 4 hours at 65° C. The resulting resin was partially saponified (vinyl alcohol=5.4%) and unsaturated (iodine number=6.9).

Using 14 grams N-benzyl-trimethyl ammonium hydroxide with a 25% slurry of VYHH in methanol, and by heating at 65° C. for 4 hours, the vinyl alcohol content of the resulting resin was 4.9% and the resin had a corrected iodine number of 4.8.

EXAMPLE 7

33 parts by weight of Bakelite "VYLF" in finely divided particulate form were dispersed in 100 parts of methanol to produce a dispersion slurry. The methanyl contained less than 1% by weight of water. To this slurry there was added with stirring 1.65 parts by weight of potassium hydroxide in the form of a 20% solution in methanol. The potassium hydroxide solution was added slowly and substantially continually over a three-hour period beginning when the dispersion reached a temperature of 65° C. The resulting mixture was heated and maintained at a temperature of about 65° C. for 4 hours. At the end of this time, the supernatant liquor was removed and the hydrolyzed resin particles were washed with two methanol washes followed by three water washes. Each was approximately equivalent in volume to the volume of mother liquor extracted from the batch.

Under the conditions specified, the product yield is about 94% of the theoretically possible resinous product.

The by-products in the mother liquor are composed of potassium acetate, potassium chloride, methanol-soluble resin fractions, and traces of uncharacterized viscous oils.

Referring more particularly to the washes, the two methanol washes extracted less than 0.5% solids from the product. The bulk of these extracted solids (65%) is water soluble and hence non-resinous. The three water washes removed less than 1% by weight of the total product and effectively functioned to remove substantially all of the residual saline impurities from the resin product. More than 98% of the total solids, both resin and alkali, have been accounted for and it is conclusively established that considerable dehydrohalogenation occurred during the treatment. The saponified resin so produced had a vinyl alcohol content of 5.2% and a corrected iodine number of 2.9.

When the same experiment was repeated with the potassium hydroxide being added all at once at the beginning of the reaction period, a somewhat lower conversion of acetate to alcohol (4.7%) was produced and the saponified product possessed a corrected iodine number of 4.5.

EXAMPLE 8

In this example there was employed Bakelite "VYNV-2" (a copolymer containing about 96% vinyl chloride and 4% vinyl acetate and having an intrinsic viscosity in cyclohexanone at 20° C. of 1.52 and a specific gravity of 1.39). The "VYNV-2" particles (size 0.05–0.15 microns in diameter) were dispersed in a methanol/tetrahydrofuran 80/20 liquid mixture to produce a dispersion containing 14 parts by weight of copolymer and 100 parts by weight of liquid mixture and less than 1% by weight of water based on the weight of the said methanol/tetrahydrofuran mixture. Hydrolysis was effected using 2.1 parts of trimethylbenzyl ammonium hydroxide. The mixture was reacted at 70° C. for four hours and the resulting hydrolyzed copolymer particles were centrifugally extracted from the mother liquor and washed with methanol and water (two washes each). The vinyl alcohol content was 1.8% and the corrected iodine number was 3.9. The resulting particulate product was successfully saponified and dehydrohalogenated and the recovered particles were substantially the same size as the starting particles.

The minor proportion of tetrahydrofuran, which is an active solvent, assists in the swelling of the copolymer particles. This is particularly desirable where the copolymer contains a very large proportion of vinyl chloride, e.g., over 90%.

The products produced in the foregoing examples are cream to yellow in color and are suitable for all applications except where a water white product is desired.

EXAMPLE 9

The hydrolyzed copolymer particles produced in Example 8 were run through a three roller mill together with a liquid organic plasticizer. More particularly, 5 parts by weight of the plasticizer di-(2-ethyl hexyl) phthalate were milled at room temperature with 10 parts by weight of the copolymer particles to achieve normal fluidity. The result was a plastisol of an unusual type in that the plastisol was thermosetting. However, unlike known thermosetting plastisols in which the plasticizer is the thermosetting component the plastisols of the invention contain dispersed copolymer particles which are themselves thermosetting.

EXAMPLE 10

The plastisol of Example 9 was coated upon blackplate and baked for 10 minutes at 375° F. to form a film having a thickness of about 3 mils. This film possessed increased resistance to solvents such as acetone in comparison with a similar film produced using a dispersion in which the copolymer of Example 9 was replaced with an equal weight of "VYNV-2," the starting material from which the copolymer of Example 8 was produced.

EXAMPLE 11

Example 10 was repeated with the incoropration of 1% by weight of benzoyl peroxide based on the weight of the copolymer particles. After baking as set forth in Example 10, the film produced was more solvent resistant than the film produced in Example 10.

EXAMPLE 12

Example 11 was repeated using cobalt naphthenate as the catalyst in place of benzoyl peroxide. Substantially identical film properties were produced.

As is well known, plastisols are dispersions of vinyl resins of small particle size in liquid plasticizers which are relatively inert toward the resins at ordinary temperatures but which form gels therewith at elevated temperatures. The plastisols before heating are pasty, flowable compositions which can be worked by spreading, molding, spraying, ripping, etc. When the conventional plastisol is heated, the resin particles flux with the plasticizer to form a gel which yields a substantially homogeneous body of plasticized vinyl resin. In the prior art, unless there are thermosetting components in the liquid plasticizer, the product is theremoplastic. The invention uniquely provides a plastisol in which the resin particle is thermosetting per se, this thermosetting characteristic being facilitated by the presence of an oxygen supplying catalyst. The plastisols of the invention exhibit improved cold flow.

Among the disperesants of plasticized which may, desirably, be selected are non-volatile oils or resinous materials which are commercially available as (1) low volatile monomeric esters of fatty acids with alkyl or alkoxy groups such as alkyl or alkoxy resinoleate where the alkyl group is methyl up to octyl and the alkoxy may be butoxy ethyl, for example, as (2) the alkoxy alkyl, aryl, and aralyl monomeric esters of dibasic acids and tribasic acids such as phthalic acid, sebacic acid, phosphoric acid and as (3) polymeric non-drying alkyd type soft resins of low molecular weight which are prepared from a polybasic acid such as phthalic, maleic or sebacic acid esterified with a polyhydric alcohol such as glycerol and ethylene glycol which may be used as such or may be modified with non-drying oils. In general, the polyester resinous plasticizers such as are available under the trade name of Paraplex may be used with the preferred vinyl resin dispersions alone but are preferably used in combination with a chemical plasticizer of the phthalate, sebacate or phosphate type.

In addition to producing desired flexibility in the baked film, the dispersant or plasticizer constitutes an integral portion of the film forming material which contains in addition the dispersed resin and which may contain one or more solid ingredients employed for pigmentation, filling, stabilization, surface active function, reinforcing or flame-proofing of the film which is produced.

There may be used any of the finely divided insoluble inorganic filler materials ordinarily used in compounding vinyl chloride plastisols, such as silica, calcium carbonate, carbon black, barium sulfate, clay, calcined clay, alumina, bentonite and the like. These pigments should be prepared so as to have particle diameters on the order of 0.5–10.0 microns. The filler materials are preferably dispersed in plasticizer and the resultant dispersion blended with the plastisol. The amount of filler used may vary from about 10% to 60%, based on the total weight of resin and filler.

EXAMPLE 13

60 parts by weight of a vinyl chloride-vinyl acetate copolymer (molecular weight 8,000) containing 60% by weight vinyl chloride and 40% by weight of vinyl acetate and having a particle size of 0.2–2 microns in diameter were slurried in 100 parts of methanol. The slurry was maintained at 65° C. and potassium hydroxide was added in a 20% methanol solution. The reaction was continued until neutrality was reached and additional potassium hydroxide was added in a 20% methanol solution. This addition of potassium hydroxide was continued incrementally until a total of 9 parts by weight of potassium hydroxide had been added and 90% of the alkali was consumed. The addition is such that no more than 4.2 parts by weight of unreacted potassium hydroxide are present at any time during the reaction. The total reaction time was 6 hours and a neutral reaction product was achieved at this time. The product contained about 7.5% vinyl alcohol by weight and had a corrected iodine number of 8. The particle size of the product was substantially the same as the particle size of the starting material. The product was washed with methanol, after removal by filtration of the mother liquor, and then with water (one wash each) and the volume of each wash was small (½ the weight of the mother liquor removed from the particles). The ash content of the washed particles was about 2.0%.

EXAMPLE 14

The particulate product of Example 13 was dispersed in water to form a dispersion containing 30 parts by weight of resin per 100 parts by weight of a water dispersion containing 25% by weight of the plasticizer di-(2-ethyl hexyl) adipate based on the weight of the resin. There was then added to the dispersion 0.1% by weight of glycerol monolaurate and 1% by weight of carboxymethyl cellulose based on the weight of the resin. Glycerol monolaurate is a non-ionic surface active agent and carboxymethyl cellulose functions to stabilize the dispersion. The pH of the dispersion was about neutral (pH 6.5–7.5). The result was an aqueous dispersion of resin particles suitable for film formation.

If desired, a small proportion of methanol, e.g., 5%–30%, may be added to the water to swell the copolymer particle and improve the stability of the emulsion.

Various types of surface active agents may be used. Anionic surface active agents such as sodium oleate or sodium lauryl benzene sulfonate and cationic surface active agents such as lauryl ammonium acetate are usable. Non-ionic surface active agents as illustrated in Example 14 are preferred for these are particularly suitable in the presence of copolymers having a high ash content.

EXAMPLE 15

The dispersion of Example 14 was filmed onto a polished stainless steel surface heated to a temperature of 80° C. and the film was dried with the assistance of warm air at a temperature of 50° C. There was formed an integral film which could be stripped from the stainless steel to produce a film suitable for wrapping. The film had a weight of 3 mg. per square inch and was thermosettable. Specifically, the film could be baked at a temperature of 300° F. to substantially enhance its resistance to solvents.

The dispersion of Example 14 was modified by the addition thereto of 10% by weight of dimethylol urea and 1% by weight of benzoyl peroxide. After filming on stainless steel, excellent solvent resistance was obtained by baking for 10 minutes at 375° F. Similar results are obtained by replacing the dimethylol urea with other insolubilizing resins such as trimethylol melamine or water-soluble phenolics.

If desired, the saponified products of the invention can be employed in admixture with unsaponified vinyl polymers and/or copolymers or with acid hydrolyzed vinyl polymer and/or copolymer. Thus, the saponified copolymer of Example 7 may be blended with from 50%–75% of the starting material and significant thermosetting characteristics retained when the mixture is dissolved, coated and then baked at a temperature of about 325° F.

Since the saponified copolymers of the invention are compatible with phenol-formaldehyde, urea-formaldehyde and melamine-formaldehyde, these resins may be used in admixture with the saponified copolymers of the invention to impart further thermosetting by co-condensation.

In accordance with the invention, the saponified copolymer may be combined with the thermosetting resin in substantially all proportions. Thus, a small proportion of the saponified copolymer of the invention can be added to a solution of the thermosetting resin to provide desirable flexibility and adhesion to the mixture. On the other hand, a small proportion of thermosetting resin may be dissolved in a solution of the saponified copolymer to provide a desirable increase in the thermoset character of the baked films which are produced. Thus, useful proportions may vary from 2/98 to 98/2 by weight.

EXAMPLE 16

20 parts of a 50% solvent solution of a butylated condensation product of 2 mols of formaldehyde with 1 mol of paraphenyl phenol produced in alkaline medium (1% by weight of ammonia based on the weight of the phenol component) in a 60:40 xylol:butanol solvent were mixed with a solution of 20 parts of the product of Example 1 in 80 parts of a 70:30 xylol-methyl ethyl ketone solvent mixture. Films cast from the solution so produced possessed increased resistance to acetone rubbing and an increased minimum fusion temperature.

EXAMPLE 17

6 parts of a 50% solvent solution of a butylated condensation product of 2 mols of formaldehyde with 1 mol of urea produced in alkaline medium in a 60:40 xylol:butanol solvent were mixed with a solution of 20 parts of the product of Example 1 in 80 parts of a 70:30 xylol-methyl ethyl ketone solvent mixture. Films cast from the solution so produced possessed increased resistance to acetone rubbing and an increased minimum fusion temperature.

EXAMPLE 18

5 parts of a butylated condensation product of 4 mols of formaldehyde with 1 mol of melamine were dissolved in a solution of 20 parts of the product of Example 1 in 80 parts of a 70:30 xylol-methyl ethyl ketone solvent mixture. Films cast from the solution so produced possessed increased resistance to acetone rubbing and an increased minimum fusion temperature.

EXAMPLE 19

Examples 16, 17 and 18 were repeated with the addition of 2 parts of Bakelite's VMCH (a copolymer of 86% vinyl chloride, 13% vinyl acetate and 1% maleic acid). Adhesion of the coating to the underlying metal surface was improved.

EXAMPLE 20

3 parts of the saponified copolymer of Example 1 were dissolved in a solution of 20 parts of the condensation product of 2 mols of formaldehyde with 1 mol of paraphenyl phenol produced in alkaline medium in 80 parts of a 70:30 xylol-methyl ethyl ketone solvent mixture. The solution so produced was coated upon a metal surface and baked to provide a coating having increased flexibility.

Pigments, dyes, waxes and other non-reactants may be added to the composition of the invention for decorative purposes and the like, and modifiers may be added for special purposes, without otherwise materially affecting the significant characteristics of the composition.

The invention, by providing compatible copolymers of low molecular weights and having substantial vinyl alcohol content, provides excellent wetting of inorganic pigments such as zinc oxide, titanium oxide, etc., and pigment paste of particularly desirable flow properties in which the pigment is exceptionally well retained in uniform suspension.

The partially saponified unsaturated vinyl copolymer products of the present invention are useful in a variety of molded plastics, free films and coatings which are resistant to oil, greases, and many solvents. Extruded tubings of these resins are useful for aircraft fuel lines as well as other applications where resistance to solvents is of importance. Thus, the free films which may be produced in accordance with the invention may be made into bags or container liners where resistance to grease, oils, solvents, etc., is of importance. The resin solutions and dispersions of the invention may also be employed as a size for textiles, the size being removable unless it is heat treated to thermoset the saponified and unsaturated vinyl copolymer constituent of the size. The solutions or dispersions of the invention may also be coated onto paper or textiles and then cured to impart grease resistance as well as other desirable characteristics to the paper or textile so treated.

In the foregoing description the term "vinyl fatty acid ester" has been used to indicate the ester radical in the copolymer such as stearate, acetate, etc., which is only partially removed to produce vinyl alcohol. It is to be understood that this term "fatty acid" obviously includes formic acid as well as higher molecular weight fatty acids. Further, the term includes unsaturated as well as saturated fatty acids, e.g., crotonic acid, eleostearic acid, ricinoleic acid, etc. Thus, if a vinyl stearate copolymer with vinyl chloride is employed as the starting particulate material for saponification, the unsaturated product containing vinyl alcohol, vinyl chloride and vinyl stearate is more hydrophobic and somewhat more flexible than the vinyl acetate analogue.

While I have described present preferred embodiments of the invention, and methods of practicing same, it will be apparent that the invention may be otherwise variously embodied and practiced within the scope of the following claims.

I claim:

1. A method of partially saponifying and partially dehydrohalogenating a copolymer of vinyl chloride and vinyl fatty acid ester containing from about 60% to about 96% by weight of vinyl chloride comprising forming a reaction mixture comprising a suspension of said copolymer in a liquid organic medium comprising a lower aliphatic alcohol containing from 1 to 4 carbon atoms, and less than approximately 5% by weight of water, any organic solvent present in said liquid organic medium being in an amount insufficient to alter the particulate entity of the suspended copolymer during reaction, said liquid organic medium having incorporated therein a strongly basic material selected from the group consisting of alkali metal hydroxides, alkali metal alcoholates and quaternary ammonium hydroxides, said reaction mixture containing from about 0.013 to about 0.18 mol pounds of strongly basic material per 100 pounds of dispersed copolymer, maintaining said suspension at a temperature of from about 60° C. to about 80° C. to convert from 15–85% of said vinyl ester to vinyl alcohol and to provide a corrected iodine number of from 2.0–10 and washing the reaction product to remove occluded salts from said copolymer.

2. A method as recited in claim 1 in which said copolymer is a copolymer comprising vinyl chloride and vinyl acetate and containing from about 80% to about 92% by weight of vinyl chloride.

3. A method as recited in claim 1 in which said strongly basic material is present in said reaction mixture in an amount of from about 0.05 to about 0.126 mol pounds of strongly basic material per 100 pounds of dispersed copolymer and said reaction mixture contains less than approximately 2% by weight of water.

4. A method as recited in claim 1 in which said copolymer is dispersed in said liquid organic medium in an amount of from about 15% to about 60% by weight based on the weight of said organic liquid and said reaction mixture is maintained at said temperature for a period from about 1 hour to about 10 hours.

5. A method as recited in claim 1 in which said liquid organic medium comprises a major proportion of methanol.

6. A method as recited in claim 1 in which said strongly basic material is employed in about stoichiometric quantity based on conversion to a vinyl alcohol content of from 2–10% by weight and an average removal of hydrogen chloride to provide about 1 double bond per copolymer molecule.

7. The thermally stable, partially saponified and partially dehydrohalogenated product produced by the method of claim 1.

References Cited in the file of this patent

UNITED STATES PATENTS

| | | |
|---|---|---|
| 1,921,326 | Robertson | Aug. 8, 1933 |
| 2,464,290 | Bowen | Mar. 15, 1949 |
| 2,483,959 | Baer | Oct. 4, 1949 |
| 2,512,726 | Penn et al. | June 27, 1950 |
| 2,536,114 | Weaver | Jan. 2, 1951 |
| 2,605,248 | Fisk | July 29, 1952 |
| 2,852,499 | Benedict et al. | Sept. 16, 1958 |

FOREIGN PATENTS

| | | |
|---|---|---|
| 565,633 | Germany | Dec. 3, 1932 |
| 659,042 | Germany | Apr. 22, 1938 |

OTHER REFERENCES

Partridge et al.: "Rubber Age," volume 67, No. 5, pages 553–556.

UNITED STATES PATENT OFFICE
CERTIFICATE OF CORRECTION

Patent No. 3,021,318            February 13, 1962

Xavier V. Laporta

It is hereby certified that error appears in the above numbered patent requiring correction and that the said Letters Patent should read as corrected below.

In the grant, lines 2 and 3, for "assignor to American-Marietta Company, Stoner-Nudge Co. Division, of Chicago, Illinois, a corporation of Illinois," read -- assignor, by mesne assignments, to Martin-Marietta Corporation, of Chicago, Illinois, a corporation of Maryland, --; lines 12 and 13, for "American-Marietta Company, Stoner-Nudge Co. Division, its successors" read -- Martin-Marietta Corporation, its successors --; in the heading to the printed specification, lines 5 to 7, for "assignor to American-Marietta Company, Stoner-Nudge Co. Division, Chicago, Ill., a corporation of Illinois" read -- assignor, by mesne assignments, to Martin-Marietta Corporation, Chicago, Ill., a corporation of Maryland --; column 11, line 73, for "iis" read -- is --; column 13, line 15, for "methanyl" read -- methanol --; column 14, line 33, for "incoropration" read -- incorporation --; line 49, for "ripping" read -- dipping --; line 54, for "theremoplastic" read -- thermoplastic --; line 60, for "disperesants of plasticized" read -- dispersants or plasticizers --; line 64, for "resinoleate" read -- ricinoleate --; line 67, for "aralyl" read -- aralkyl --.

Signed and sealed this 31st day of July 1962.

(SEAL)
Attest:
ERNEST W. SWIDER
Attesting Officer

DAVID L. LADD
Commissioner of Patents